(12) United States Patent
    Cabrita

(10) Patent No.: US 10,737,790 B1
(45) Date of Patent: Aug. 11, 2020

(54) SAFETY BARRIER FOR AIRCRAFT SEATS

(71) Applicant: Pedro Cabrita, Monmouth Junction, NJ (US)

(72) Inventor: Pedro Cabrita, Monmouth Junction, NJ (US)

( * ) Notice: Subject to any disclaimer, the term of this patent is extended or adjusted under 35 U.S.C. 154(b) by 0 days.

(21) Appl. No.: 16/181,484

(22) Filed: Nov. 6, 2018

(51) Int. Cl.
    *B64D 11/06* (2006.01)
    *B60N 2/90* (2018.01)

(52) U.S. Cl.
    CPC .............. *B64D 11/062* (2014.12); *B60N 2/90* (2018.02); *B64D 11/0606* (2014.12)

(58) Field of Classification Search
    CPC ..... B64D 11/062; B64D 11/0606; A47C 7/66; B60N 2/90
    USPC .......................................... 297/184.1, 423.17
    See application file for complete search history.

(56) References Cited

U.S. PATENT DOCUMENTS

| | | | | |
|---|---|---|---|---|
| 3,268,257 A | * | 8/1966 | Delaney | B60N 2/62 297/423.17 |
| D366,375 S | | 1/1996 | Cross | |
| 6,113,183 A | | 9/2000 | Koch | |
| 6,142,574 A | * | 11/2000 | Alexander | B60N 2/91 297/464 |
| 6,644,736 B2 | | 11/2003 | Nguyen | |
| 7,641,278 B2 | * | 1/2010 | Strasser | B64D 11/06 244/118.6 |
| 9,049,933 B2 | | 6/2015 | Lavey | |
| 9,248,765 B2 | | 2/2016 | Friedlander | |
| 9,428,932 B2 | | 8/2016 | Daly | |
| 9,756,946 B2 | | 9/2017 | Chang | |
| 2005/0194827 A1 | * | 9/2005 | Dowty | B60N 2/62 297/411.3 |
| 2018/0281637 A1 | * | 10/2018 | Ott | B60N 2/882 |

FOREIGN PATENT DOCUMENTS

| | | | |
|---|---|---|---|
| DE | 102017107139 A1 * | 10/2018 | ......... B64D 11/0644 |
| WO | 2016167820 | 10/2016 | |

* cited by examiner

*Primary Examiner* — Milton Nelson, Jr.
(74) *Attorney, Agent, or Firm* — Kyle A. Fletcher, Esq.

(57) ABSTRACT

The safety barrier for aircraft seats is configured for use with a commercial aircraft. The commercial aircraft further comprises one or more seats. Each individual seat selected from the one or more seats further comprises an armrest. The individual seat is configured for use with by a client. The client sits in the individual seat. The safety barrier for aircraft seats is configured for use with the armrest. The safety barrier for aircraft seats comprises a knee shield and elbow parapet. The knee shield attaches to the armrest. The elbow parapet attaches to the armrest. The knee shield is a rotating barrier. The knee shield forms a barrier that prevents a knee of the client from entering the aisle of the commercial aircraft. The elbow parapet is a stationary barrier. The elbow parapet prevents the elbow of the client from entering the aisle of the commercial aircraft.

17 Claims, 4 Drawing Sheets

SAFETY BARRIER FOR AIRCRAFT SEATS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and aircraft including passenger and crew accommodations, more specifically, a separator specially adapted for aircraft seats. (B64D11/0606)

SUMMARY OF INVENTION

The safety barrier for aircraft seats is configured for use with a commercial aircraft. The commercial aircraft further comprises one or more seats. Each individual seat selected from the one or more seats further comprises an armrest. The individual seat is configured for use with by a client. The client sits in the individual seat. The safety barrier for aircraft seats is configured for use with the armrest. The safety barrier for aircraft seats comprises a knee shield and elbow parapet. The knee shield attaches to the armrest. The elbow parapet attaches to the armrest. The knee shield is a rotating barrier. The knee shield forms a barrier that prevents a knee of the client from entering the aisle of the commercial aircraft. The elbow parapet is a stationary barrier. The elbow parapet prevents the elbow of the client from entering the aisle of the commercial aircraft.

These together with additional objects, features and advantages of the safety barrier for aircraft seats will be readily apparent to those of ordinary skill in the art upon reading the following detailed description of the presently preferred, but nonetheless illustrative, embodiments when taken in conjunction with the accompanying drawings.

In this respect, before explaining the current embodiments of the safety barrier for aircraft seats in detail, it is to be understood that the safety barrier for aircraft seats is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the safety barrier for aircraft seats.

It is therefore important that the claims be regarded as including such equivalent construction insofar as they do not depart from the spirit and scope of the safety barrier for aircraft seats. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
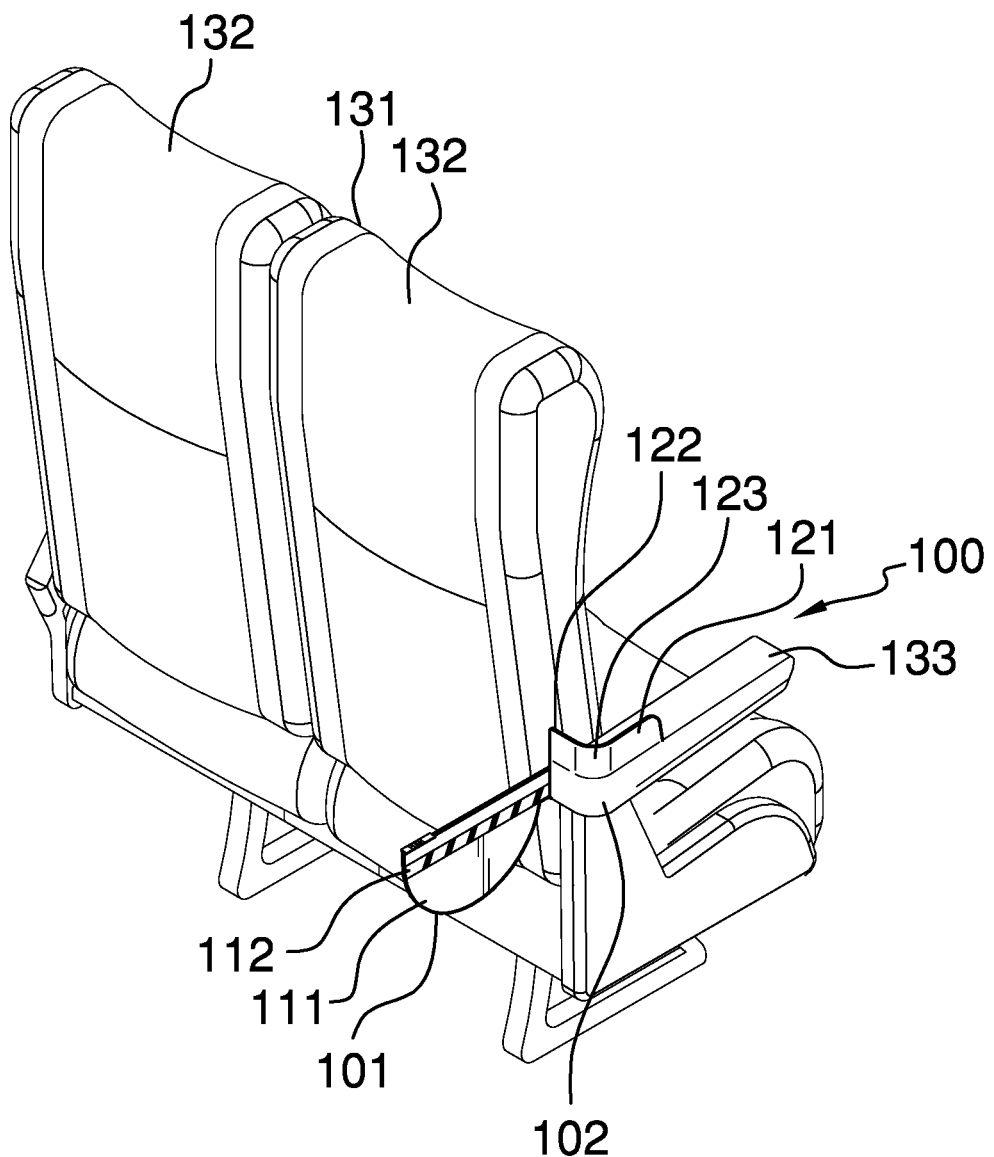
FIG. 1 is a perspective view of an embodiment of the disclosure.
Figure 2:
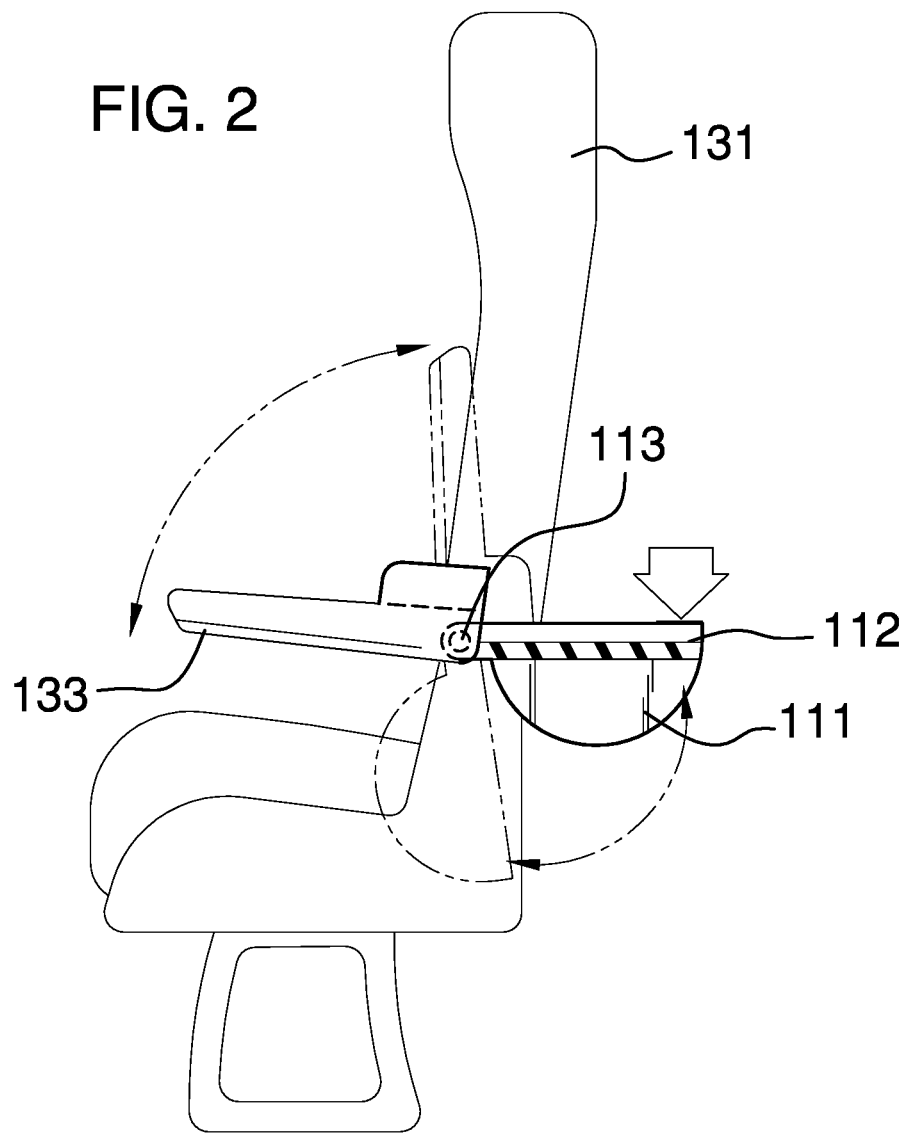
FIG. 2 is a side view of an embodiment of the disclosure.
Figure 3:
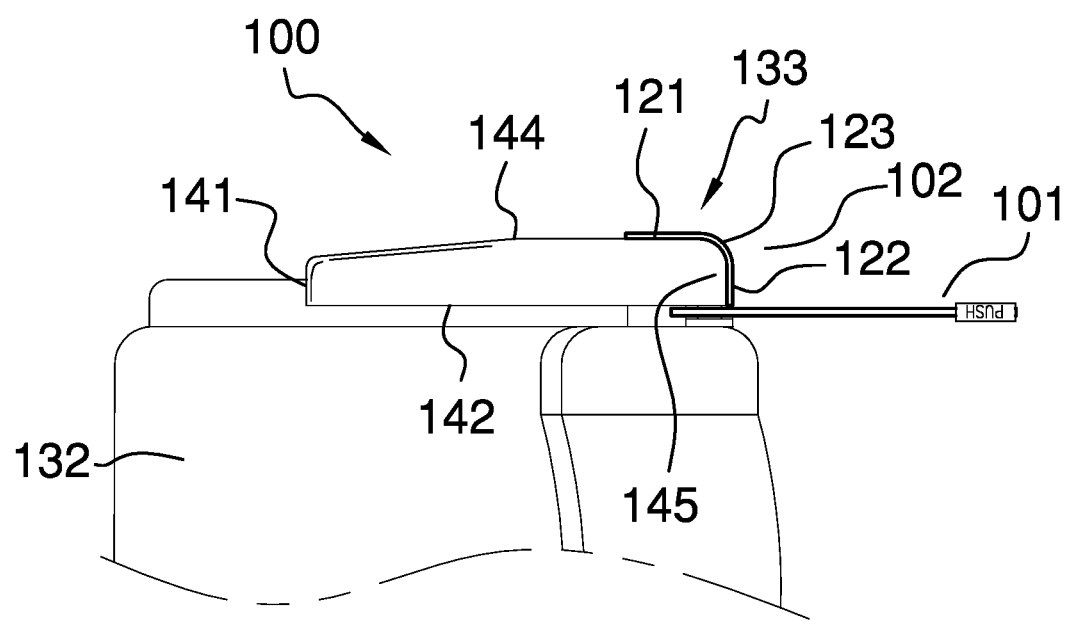
FIG. 3 is a top view of an embodiment of the disclosure.
Figure 4:
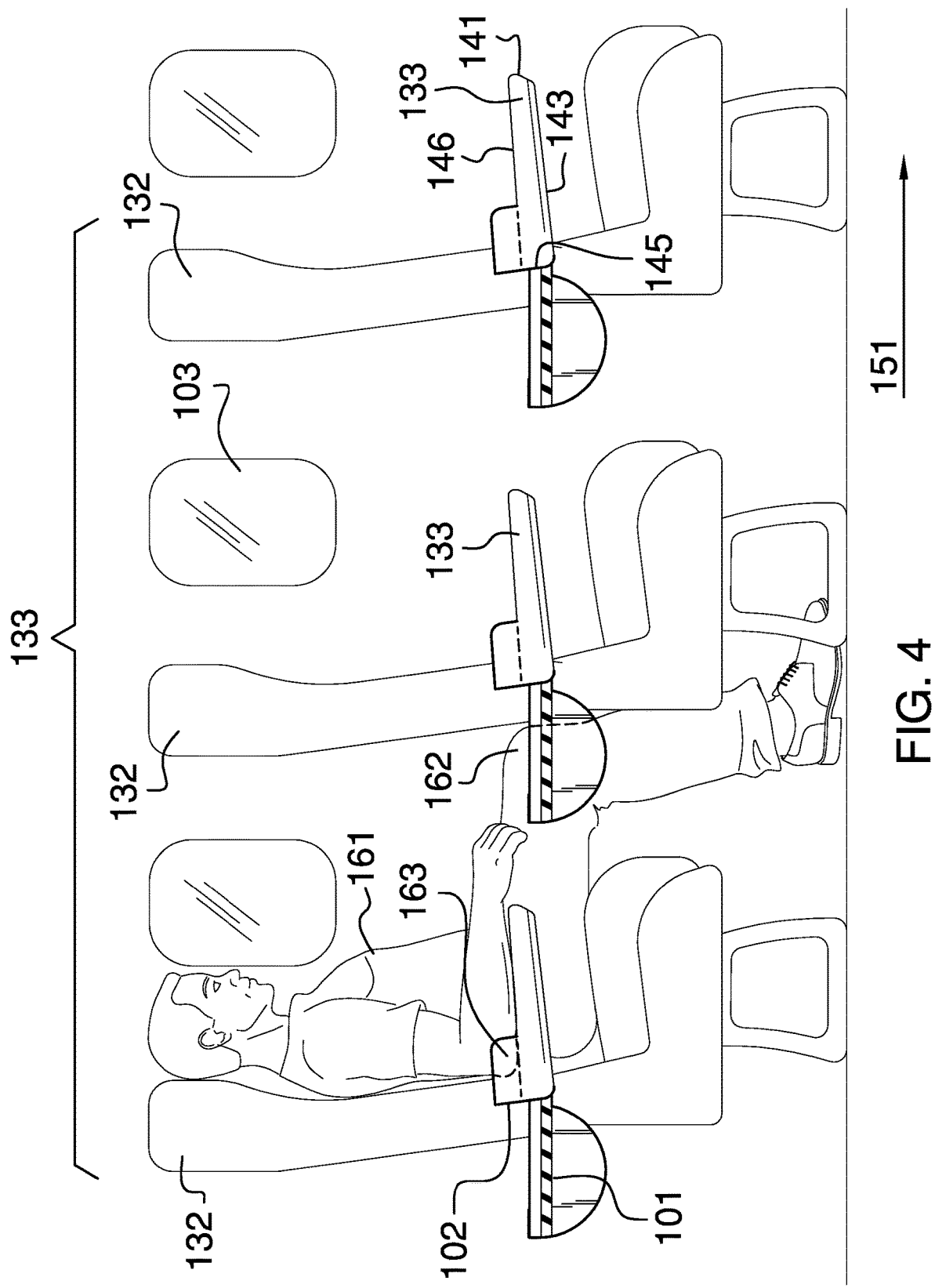
FIG. 4 is an in-use view of an embodiment of the disclosure.

Detailed reference will now be made to one or more potential embodiments of the disclosure, which are illustrated in FIGS. 1 through 4.

The safety barrier for aircraft seats 100 (hereinafter invention) is configured for use with a commercial aircraft 103. The commercial aircraft 103 further comprises one or more seats 131. Each individual seat 132 selected from the one or more seats 131 further comprises an armrest 133. The individual seat 132 is configured for use with by a client 161. The client 161 is further defined with a knee 162 and an elbow 163. The client 161 sits in the individual seat 132. The invention 100 is configured for use with the armrest 133. The commercial aircraft 103 is further defined with a primary sense of direction 151.

Each of the one or more seats 131 is a seat contained within the commercial aircraft 103. There is a one to one relationship between the one or more seats 131 and the number of clients 161 carried as passengers on the commercial aircraft 103. There are always more seats in the one or more seats 131 of the commercial aircraft 103 than clients 161 being carried as passengers. The individual seat 132 refers to a seat selected from the one or more seats 131. The armrest 133 is a structure associated with each individual seat 132. The armrest 133 is a roughly prism-shaped structure. The armrest 133 is further defined with a bow face 141, a client 161 side face 142, an inferior face 143, a service side face 144, a stern face 145, and a superior face 146.

The bow face 141 is the end of the prism shape of the armrest 133 that is the most forward surface of the armrest 133. The client 161 side face 142 is the lateral face of the armrest 133 that is proximal to the client 161. The inferior face 143 is the lateral face of the armrest 133 that forms the inferior surface of the armrest 133. The service side face 144 is the lateral face of the armrest 133 that is proximal to the aisle of the commercial aircraft 103. The service side face 144 is distal from the client 161 side face 142. The stern face 145 is the end of the prism shape of the armrest 133 that is distal from the bow face 141. The superior face 146 is the lateral face of the armrest 133 that is distal from the bow face 141. The superior face 146 forms the superior surface of the armrest 133.

The invention 100 comprises a knee 162 shield 101 and elbow 163 parapet 102. The knee 162 shield 101 attaches to the armrest 133. The elbow 163 parapet 102 attaches to the armrest 133. The knee 162 shield 101 is a rotating barrier. The knee 162 shield 101 forms a barrier that prevents a knee 162 of the client 161 from entering the aisle of the commercial aircraft 103. The elbow 163 parapet 102 is a stationary barrier. The elbow 163 parapet 102 prevents the elbow 163 of the client 161 from entering the aisle of the commercial aircraft 103.

The knee 162 shield 101 is a rotating barrier structure. The knee 162 shield 101 attaches to the armrest 133 of a first individual seat 132 selected from the one or more seats 131 of the commercial aircraft 103. The knee 162 shield 101 protects the client 161 seated in a second individual seat 132 selected from the one or more seats 131. The second individual seat 132 is directly aft of the first individual seat 132. The knee 162 shield 101 rotates such that the knee 162 shield 101 forms a barrier structure next to the knee 162 of the client 161. The knee 162 shield 101 forms a physical barrier that prevents the knee 162 of the client 161 from extending into the aisle of the commercial aircraft 103. The knee 162 shield 101 comprises a knee 162 plate 111, a rotating arm 112, and a locking pivot 113.

The knee 162 plate 111 is a plate structure. The knee 162 plate 111 forms the physical barrier that protects the knee 162 of the client 161. The knee 162 plate 111 has a disk shape. In the first potential embodiment of the disclosure, the knee 162 plate 111 has a semicircular shape.

The rotating arm 112 is a shaft. The rotating arm 112 attaches the knee 162 plate 111 to the locking pivot 113. The rotating arm 112 attaches to the locking pivot 113 in the manner of a cantilever. The rotating arm 112 rotates around the locking pivot 113 such that the rotation of the rotating arm 112 rotates the knee 162 plate 111 into and out of position. The rotating arm 112 rotates the knee 162 plate 111 out of the way of the client 161 during the takeoff, landing, and client 161 loading processes of the commercial aircraft 103.

The locking pivot 113 attaches the fixed end of the rotating arm 112 to the client 161 side face 142 of the armrest 133 of the individual seat 132. The locking pivot 113 is a pivoting structure. The locking pivot 113 locks into a fixed position. The locking pivot 113 allows the rotating arm 112 to rotate relative to the armrest 133 of the individual seat 132. The locking pivot 113 locks the rotating arm 112 into a fixed position relative to the armrest 133 of the individual seat 132.

The elbow 163 parapet 102 is a fixed structure. The elbow 163 parapet 102 attaches to the armrest 133 of an individual seat 132 selected from the one or more seats 131. The elbow 163 parapet 102 protects the client 161 seated in the individual seat 132 associated with the armrest 133 attached to the individual seat 132. The elbow 163 parapet 102 forms a physical barrier that prevents the elbow 163 of the client 161 from extending into the aisle of the commercial aircraft 103. The elbow 163 parapet 102 comprises a service side segment 121, a stern segment 122, and an aft brink 123.

The service side segment 121 is a disk-shaped parapet. The service side segment 121 has a rounded rectangular shape. The service side segment 121 attaches to the perimeter of the superior face 146 of the armrest 133. The service side segment 121 projects perpendicularly away from the superior face 146 of the armrest 133. The face of the service side segment 121 aligns with the service side face 144 of the armrest 133. The service side segment 121 is a portion of the physical barrier that prevents the elbow 163 of the client 161 from entering the aisle of the commercial aircraft 103.

The stern segment 122 is a disk-shaped parapet. The stern segment 122 has a rounded rectangular shape. The stern segment 122 attaches to the perimeter of the superior face 146 of the armrest 133. The stern segment 122 projects perpendicularly away from the superior face 146 of the armrest 133. The face of the stern segment 122 aligns with the stern face 145 of the armrest 133. The stern segment 122 is a portion of the physical barrier that prevents the elbow 163 of the client 161 from entering the aisle of the commercial aircraft 103.

The aft brink 123 is a curved parapet. The aft brink 123 is a rounded structure that forms the brink between the service side segment 121 and the stern segment 122. The aft brink 123 attaches to the perimeter of the superior face 146 of the armrest 133. The aft brink 123 projects perpendicularly away from the superior face 146 of the armrest 133.

The face of the aft brink 123 aligns with the service side face 144 of the armrest 133. The face of the aft brink 123 aligns with the stern face 145 of the armrest 133. The aft brink 123 aligns with the perimeter of the rear superior corner of the armrest 133 formed at the brink of the service side face 144 and the stern face 145. The aft brink 123 aligns with the face of the service side segment 121. The aft brink 123 aligns with the face of the stern segment 122.

The aft brink 123 is a portion of the physical barrier that prevents the elbow 163 of the client 161 from entering the aisle of the commercial aircraft 103.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Barrier: As used in this disclosure, a barrier is a physical obstacle that forms a boundary between a first space and a second space. The barrier prevents the passage of an object between the first space and the second space.

Bow: As used in this disclosure, the bow refers to the anterior side of an object, vehicle, or vessel. Specifically, the bow refers to the most forward element of the object in the direction of the primary sense of direction of the object, vehicle, or vessel.

Brink: As used in this disclosure, a brink refers to the discontinuous edge or line formed by the intersection of a first plane or surface and a second plane or surface wherein a cant exists between the first plane or surface and the second plane or surface.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Client: As used in this disclosure, a client is a person who is designated to receive the services of the disclosure at bar.

Disk: As used in this disclosure, a disk is a prism-shaped object that is flat in appearance. Specifically, the sum of the surface areas of two ends of the prism-shaped object that forms the disk is greater than the surface area of the lateral face of the prism-shaped object that forms the disk. In this disclosure, the ends of the prism-shaped structure that forms the disk are referred to as the faces of the disk.

Force of Gravity: As used in this disclosure, the force of gravity refers to a vector that indicates the direction of the pull of gravity on an object at or near the surface of the earth.

Forward: As used in this disclosure, forward is a term that relates a first object to a second object. When the first object is closer to the bow of a vehicle, the first object is said to be forward of the second object. The term is commonly used on vessels and vehicles.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Lock: As used in this disclosure, a lock is a fastening device that secures a rotating mechanical device into a fixed position.

Mirror Image: As used in this disclosure, a mirror image refers to a second object that is a reproduction of a first object wherein the second object is identical to the first object except that the orientation of the second object is reversed relative to the first object as if the second object has been reflected by a plane of a mirror (often called the mirror plane or plane of reflection).

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Parapet: As used in this disclosure, a parapet is a vertical surface that is formed along the perimeter of a raised horizontal surface. The parapet projects away from the horizontal surface in the superior direction.

Perimeter: As used in this disclosure, a perimeter is one or more curved or straight lines that bounds an enclosed area on a plane or surface. The perimeter of a circle is commonly referred to as a circumference.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular appearance. Plates often have a disk-like structure. The face of the plate is a surface of the plate selected from the group consisting of: a) the surface of the plate with the greatest surface area; b) the surface of the plate that is distal from the surface of the plate with the greatest surface area. The edges of the plate comprise the surfaces of the plate that would not be considered faces as defined above. As defined in this disclosure, plates may be made of any material, but are commonly made of metal, plastic, and wood. When made of wood, a plate is often referred to as a board or a plank.

Pivot: As used in this disclosure, a pivot is a rod or shaft around which an object rotates or swings.

Port: As used in this disclosure, port refers to the left side of a vehicle when a viewer is facing towards the primary sense of direction of the vehicle. See bow, forward, aft, starboard, and stern Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rounded: A used in this disclosure, the term rounded refers to the replacement of an apex, vertex, or edge or brink of a structure with a (generally smooth) curvature wherein the concave portion of the curvature faces the interior or center of the structure.

Seat: As used in this disclosure, a seat is a structure that a person can sit on. Chair is a common synonym for a seat.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Vehicle: As used in this disclosure, a vehicle is a motorized device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A safety barrier for an aircraft seat comprising:
a knee shield and elbow parapet;
wherein the knee shield forms a barrier that is adapted to prevent a knee of a client from entering an aisle of a commercial aircraft;
wherein the elbow parapet is adapted to protect said client where said client is seated in an individual seat of said commercial aircraft from risk of injury due to extending into the aisle;
wherein the elbow parapet is adapted to form a physical barrier between an elbow of the client from extending into the aisle of the commercial aircraft from risk of injury due to extending into the aisle;
wherein the individual seat is one of one or more seats within the commercial aircraft;
wherein each individual seat selected from the one or more seats further comprises an armrest;
wherein the knee shield attaches to the armrest;
wherein the elbow parapet attaches to the armrest;
wherein the safety barrier for an aircraft seat is configured for use with the armrest;
wherein the armrest is a prism-shaped structure;
wherein the armrest is further defined with a bow face, a client side face, an inferior face, a service side face, a stern face, and a superior face;
wherein the knee shield is a rotating barrier structure;
wherein the elbow parapet is a fixed structure;
wherein the elbow parapet attaches to the armrest of an individual seat selected from the one or more seats.

2. The safety barrier for an aircraft seat according to claim 1
wherein the knee shield attaches to the armrest of a first individual seat selected from the one or more seats of the commercial aircraft;
wherein the knee shield protects the client seated in a second individual seat selected from the one or more seats;
wherein the second individual seat is directly aft of the first individual seat.

3. The safety barrier for an aircraft seat according to claim 2
wherein the knee shield rotates such that the knee shield is adapted to form a barrier structure next to the knee of the client;
wherein the knee shield forms a physical barrier that prevents the knee of the client from extending into the aisle of the commercial aircraft.

4. The safety barrier for an aircraft seat according to claim 3
wherein the knee shield comprises a knee plate, a rotating arm, and a locking pivot;
wherein the rotating arm attaches the knee plate to the locking pivot.

5. The safety barrier for an aircraft seat according to claim 4
wherein the knee plate is a plate structure;
wherein the knee plate forms the physical barrier that protects the knee of the client;
wherein the knee plate has a disk shape.

6. The safety barrier for an aircraft seat according to claim 5
wherein the rotating arm is a shaft;
wherein the rotating arm attaches the knee plate to the locking pivot;
wherein the rotating arm attaches to the locking pivot in a manner of a cantilever.

7. The safety barrier for an aircraft seat according to claim 6 wherein the rotating arm rotates around the locking pivot such that the rotation of the rotating arm rotates the knee plate into and out of position.

8. The safety barrier for an aircraft seat according to claim 7 wherein the locking pivot attaches the fixed end of the rotating arm to the client side face of the armrest of the individual seat.

9. The safety barrier for an aircraft seat according to claim 8
wherein the locking pivot is a pivoting structure;
wherein the locking pivot locks into a fixed position.

10. The safety barrier for an aircraft seat according to claim 9 wherein the locking pivot allows the rotating arm to rotate relative to the armrest of the individual seat.

11. The safety barrier for an aircraft seat according to claim 10 wherein the locking pivot locks the rotating arm into a fixed position relative to the armrest of the individual seat.

12. The safety barrier for an aircraft seat according to claim 11
wherein the elbow parapet comprises a service side segment, a stern segment, and an aft brink;
wherein the aft brink attaches the service side segment to the stern segment;
wherein the service side segment, a stern segment, and an aft brink attach to the superior face of the armrest;
wherein the service side segment is a portion of the physical barrier that prevents the elbow of the client from entering the aisle of the commercial aircraft;

wherein the stern segment is a portion of the physical barrier that prevents the elbow of the client from entering the aisle of the commercial aircraft;

wherein the aft brink is a portion of the physical barrier that prevents the elbow of the client from entering the aisle of the commercial aircraft.

13. The safety barrier for an aircraft seat according to claim 12 wherein the service side segment is a disk-shaped parapet;

wherein the service side segment has a rounded rectangular shape;

wherein the service side segment attaches to the perimeter of the superior face of the armrest;

wherein the service side segment projects perpendicularly away from the superior face of the armrest.

14. The safety barrier for an aircraft seat according to claim 13 wherein the stern segment is a disk-shaped parapet;

wherein the stern segment has a rounded rectangular shape;

wherein the stern segment attaches to the perimeter of the superior face of the armrest;

wherein the stern segment projects perpendicularly away from the superior face of the armrest.

15. The safety barrier for an aircraft seat according to claim 14 wherein the aft brink is a curved parapet;

wherein the aft brink is a rounded structure that forms the brink between the service side segment and the stern segment;

wherein the aft brink attaches to the perimeter of the superior face of the armrest;

wherein the aft brink projects perpendicularly away from the superior face of the armrest.

16. The safety barrier for an aircraft seat according to claim 15 wherein a face of the service side segment aligns with a service side face of the armrest;

wherein a face of the stern segment aligns with the stern face of the armrest;

wherein the face of the aft brink aligns with the service side face of the armrest;

wherein the face of the aft brink aligns with the stern face of the armrest;

wherein the aft brink aligns with the perimeter of the rear superior corner of the armrest formed at the brink of the service side face and the stern face;

wherein the aft brink aligns with the face of the service side segment;

wherein the aft brink aligns with the face of the stern segment.

17. The safety barrier for an aircraft seat according to claim 16 wherein the knee plate has a semicircular shape.

* * * * *